United States Patent
Watson et al.

(10) Patent No.: US 11,652,713 B2
(45) Date of Patent: *May 16, 2023

(54) NETWORK PACKET CAPTURE MANAGER

(71) Applicant: Capital One Services, LLC, McLean, VA (US)

(72) Inventors: John Watson, Falls Church, VA (US); Christopher Roosenraad, Vienna, VA (US); Aaron Eppert, Lawrenceburg, IN (US); Travis Scheponik, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,089

(22) Filed: May 16, 2022

(65) Prior Publication Data
US 2022/0278909 A1     Sep. 1, 2022

Related U.S. Application Data

(63) Continuation of application No. 16/891,883, filed on Jun. 3, 2020, now Pat. No. 11,336,542.

(51) Int. Cl.
*H04L 43/04* (2022.01)
*H04L 47/2441* (2022.01)
(Continued)

(52) U.S. Cl.
CPC ............ *H04L 43/04* (2013.01); *G06N 20/00* (2019.01); *H04L 9/0891* (2013.01); *H04L 41/16* (2013.01);
(Continued)

(58) Field of Classification Search
CPC ....... G06N 20/00; H04L 9/0891; H04L 41/16; H04L 43/022; H04L 43/04; H04L 45/20; H04L 47/2441; H04L 63/1425
See application file for complete search history.

(56) References Cited

U.S. PATENT DOCUMENTS

| | | |
|---|---|---|
| 7,590,844 B1 | 9/2009 | Sherman et al. |
| 8,527,468 B1 | 9/2013 | Crafford et al. |

(Continued)

OTHER PUBLICATIONS

International Search Report and Written Opinion of the International Searching Authority directed to related International Patent Application No. PCT/US 21/35746, dated Oct. 18, 2021; 30 pages.

*Primary Examiner* — George C Neurauter, Jr.
(74) *Attorney, Agent, or Firm* — Sterne, Kessler, Goldstein & Fox P.L.L.C.

(57) ABSTRACT

The packet capture manager uses a multi-tiered storage for storing captured network traffic. Captured packets are stored on a primary storage with a time-to-live according to a retention policy. The packet capture manager receives instructions from one or more network monitoring devices identifying one or more captured packets as packets of interest. The packet capture manager flags the identified packets as packets of interest, moves the flagged packets to a secondary storage, and changes the TTL of the moved packets. A machine learning model analyzes historical data of the instructions received from the one or more network monitoring devices. The packet capture manager uses the machine learning model to identify packets of interest and move identified packets to the secondary storage without specific instructions from a network monitoring device.

20 Claims, 5 Drawing Sheets

(51) Int. Cl.
    *G06N 20/00*     (2019.01)
    *H04L 9/08*     (2006.01)
    *H04L 45/00*     (2022.01)
    *H04L 43/022*     (2022.01)
    *H04L 41/16*     (2022.01)
    *H04L 9/40*     (2022.01)

(52) U.S. Cl.
    CPC ............ *H04L 43/022* (2013.01); *H04L 45/20* (2013.01); *H04L 47/2441* (2013.01); *H04L 63/1425* (2013.01)

(56) References Cited

U.S. PATENT DOCUMENTS

| | | | |
|---|---|---|---|
| 10,205,712 | B2 | 2/2019 | Smith et al. |
| 10,326,741 | B2 | 6/2019 | Rothstein et al. |
| 10,360,196 | B2 | 7/2019 | Hsiao et al. |
| 10,769,118 | B1 | 9/2020 | Abushwashi |
| 2008/0033905 | A1 | 2/2008 | Stokes |
| 2008/0034049 | A1 | 2/2008 | Stokes |
| 2008/0052284 | A1 | 2/2008 | Stokes |
| 2013/0046993 | A1 | 2/2013 | Jueneman et al. |
| 2014/0165133 | A1 | 6/2014 | Foley et al. |
| 2015/0370723 | A1 | 12/2015 | Nambiar et al. |
| 2016/0112287 | A1 | 4/2016 | Farmer et al. |
| 2017/0163736 | A1 | 6/2017 | Jiang et al. |
| 2017/0207990 | A1 | 7/2017 | Curtin et al. |
| 2017/0214718 | A1 | 7/2017 | Couterier et al. |
| 2017/0264630 | A1 | 9/2017 | Meves |
| 2017/0279817 | A1 | 9/2017 | Campbell et al. |
| 2017/0374090 | A1 | 12/2017 | McGrew et al. |
| 2018/0034716 | A1 | 2/2018 | Bird et al. |
| 2018/0062854 | A1 | 3/2018 | Kancharla et al. |
| 2018/0152467 | A1 | 5/2018 | Anderson et al. |
| 2018/0191501 | A1 | 7/2018 | Lindemann |
| 2018/0288021 | A1 | 10/2018 | Basin |
| 2019/0068564 | A1 | 2/2019 | Putatunda et al. |
| 2021/0273949 | A1 | 9/2021 | Howlett et al. |
| 2021/0385138 | A1 | 12/2021 | Watson et al. |

NETWORK PACKET CAPTURE MANAGER

CROSS-REFERENCE TO RELATED APPLICATIONS

This application is a continuation of U.S. application Ser. No. 16/891,883, filed on Jun. 3, 2020, the contents of which is incorporated herein by reference in its entirety.

FIELD

Embodiments generally relate to computer network traffic monitoring and analysis.

BACKGROUND

A computer network, often referred to as a network, is an arrangement of interconnected computers in digital communication with each other. Computers in a network can share data, resources and computing power to accomplish useful tasks. Computers may send data to each other in discrete bundles of information called packets. The data sent between computers in a network may be referred to as network traffic. An exchange of network packets between a source and destination may be called a data flow.

Networks may require some amount of management and maintenance to operate effectively. The field of computer network management may involve capturing network traffic and storing captured network traffic in a storage device. Network management tools may be used to analyze captured network traffic to discover and investigate network events related to a security breach or communication failure. The amount of storage required for storing captured network traffic depends on the network traffic flow rate and a retention policy. A retention policy dictates the amount of time that captured traffic should be stored. The amount of storage provisioned for packet capture storage may be determined based on expected traffic flow rate and the desired storage time for captured packets.

Network traffic can be volatile and unpredictable, and selecting an appropriate amount of packet capture storage can be difficult. If traffic spikes above the expected amount of traffic and causes packet capture storage to fill up, new traffic may be dropped, the packets stored may fall out of compliance with a retention policy, and/or old traffic that should still be stored may be deleted prematurely to free storage space for newer captured traffic. Responding to spikes in traffic may be difficult because important data may be lost during the process of provisioning new storage space. If traffic flow is less than expected, excess space may go unused, wasting resources.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
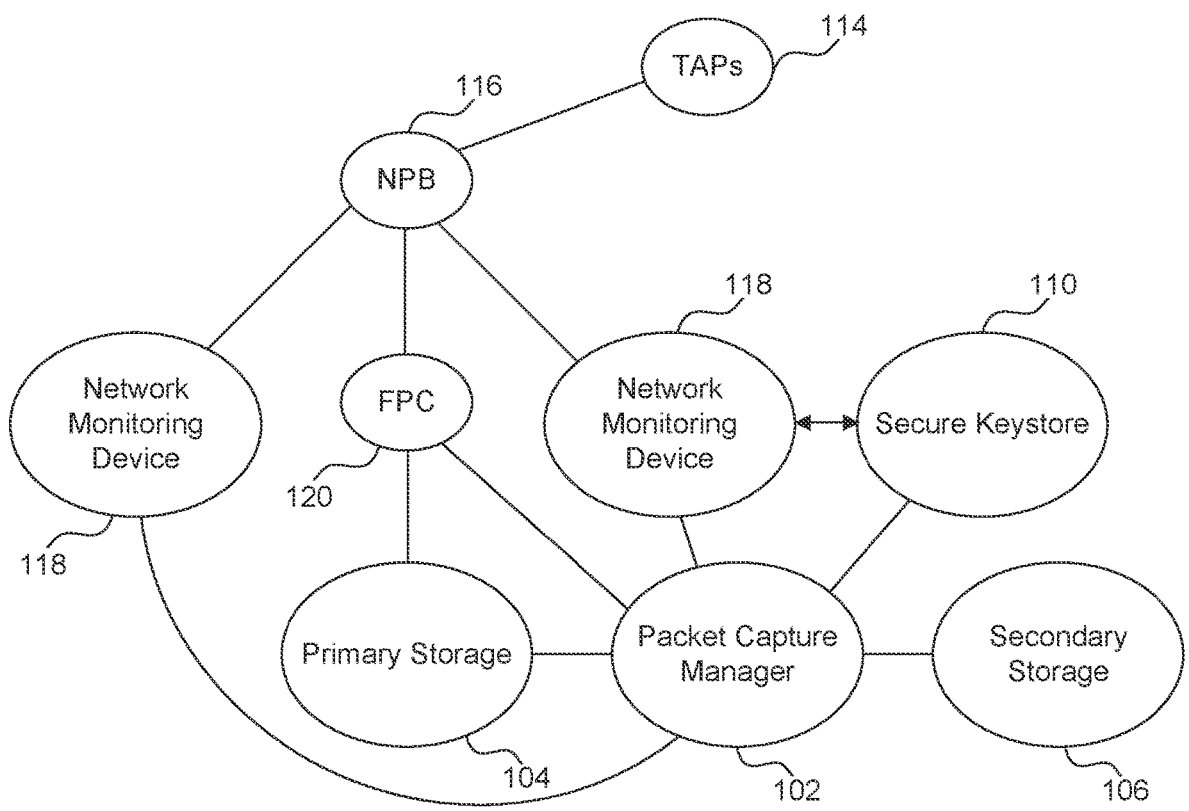
FIG. 1 is a block diagram of a network management infrastructure including a packet capture manager, according to some embodiments.

Computer network management may include monitoring and capturing packets sent over the network to identify security threats, detect and correct network communication issues, or perform forensic analysis. Packets may include a header and a payload. The header may include the source address and destination address of the packet. The payload is typically encrypted and may contain data related to an application using network resources. Although packet headers can provide some insight into the network traffic, certain analysis and threat detection requires capturing and decrypting the packet payload.

Full packet capture (FPC) is a method of network monitoring where the packet header and payload are captured and stored. FPC may also include storing metadata related to the captured packets and acquiring and storing decryption keys required to decrypt encrypted packet payloads.

Storage of captured packets has historically taken a static approach due to the deployment of network infrastructures on-premise in data centers and third-party colocation centers. A colocation center is a data center where network equipment and storage space are made available for rental to customers. FPC requires significant amounts of storage for writing packets to disk. The amount of storage required depends on the amount of traffic the FPC solution is expected to capture and how long the captured traffic needs to be stored. Static storage capacity may be added based on an expectation of increased network traffic or a planned change in a retention policy. The retention policy includes service level requirements such as a time-to-live (TTL) that defines an amount of time that captured packets should be stored before deletion. Often, packet capture data is stored in a ring buffer, which deletes old data by overwriting it with new data. Adding capacity may involve purchasing, deploying, and configuring additional storage. This process is costly and can take months to deliver the extra capacity on the data center floor.

Network traffic levels on a network may be variable and may rapidly increase over time. If network traffic levels spike or consistently increase to sufficiently overwhelm the static capacity of the on-premise FPC solution, then packets may be dropped, leading to missing data, missing forensic evidence, or failure to meet the requirements of the retention policy. An FPC solution may be configured to provide a retention timeframe for the captured packets and metadata related the captured packets. The metadata may index the captured packets. Example metadata may include identifying information of a security certificate corresponding to a captured packet, domain information, a source IP address, a source port, a destination IP address, a destination port, or an unencrypted portion of the captured packet. Metadata may also include information regarding how the packets were captured, a timestamp, the network site and network device where the packets were captured, information related to filters that were applied to the captured network traffic, and any other contextual information related to the captured packets. The captured packets and the metadata may be collectively referred to as PCAP. The factors that determine the amount of PCAP storage space to deploy for an FPC solution include the rate of network traffic and the number of hours (days, weeks, or months) of desired PCAP retention. As a non-limiting example, if the traffic levels are 10 Gigabits per second (including network traffic and metadata) and the Retention policy is 7 days, then the FPC solutions requires 756 TB of storage.

Some full packet capture solutions include single-tiered storage that implements a ring buffer. A ring buffer overwrites older data to continuously capture new data without exceeding the capacity of a disk or storage volume. This kind of single-tiered storage can be costly and may require long lead times to upgrade when network traffic increases significantly over time. These FPC solutions are unintelligent. That is, they may be configured to capture everything on the network because the FPC solution cannot distinguish malicious traffic from normal traffic.

According to some embodiments, an intelligent FPC solution may include multi-tiered storage systems with a retention policy that intelligently determines which packets to save for later analysis by moving them from a primary storage 104 to a secondary storage. This multi-tiered storage system enables deployment of significantly less local storage and intelligently copying interesting or malicious captured traffic from a primary storage 104 ring-buffer and into a secondary storage service. Applying a multi-tier storage architecture along with a retention policy to intelligently move captured traffic out of the ring buffer solves the storage limitations of traditional full packet capture solutions. A packet capture manager 102 of the disclosed embodiments integrates with other network monitoring devices 118 that may identify captured packets to move from primary storage 104 to secondary storage. The packet capture manager 102 also uses machine learning to predict which PCAP files can be moved from the ring buffer in primary storage 104 to long term secondary storage. Because the secondary storage stores only captured network traffic considered to be possibly useful for investigating network security events or performance issues, the storage requirements of the secondary storage may be much smaller than the storage requirements of the primary storage 104, and the TTL of captured packets stored in the secondary storage can be higher. Alternatively, the primary storage may be smaller than the secondary storage as the machine learning gets smarter and discriminates between packets more effectively. The secondary storage may increase the effective available PCAP retention to an unlimited amount of time for packets of interest.

According to some embodiments, a system for packet capture management is configured to operate in an on-premise or cloud computing environment, where one or more network Terminal Access Points (TAPs) 114 capture network traffic and send captured traffic to a full packet capture module 120. The full packet capture module 120 of some embodiments includes a processor and memory configured to store a first network packet in a primary storage 104. A retention policy specifies an amount of time that traffic captured by the packet capture management system should be stored and includes a time-to-live (TTL) of the first network packet. The packet capture manager 102 receives an instruction, from a first network monitoring device 118 that monitors or analyzes the traffic, identifying the first network packet capture file as being of interest to a network administrator. A network packet capture file stores a captured data flow, including a plurality of packets, between a source and a destination exchanging network packets. An example data flow may be an HTTP request and response. In response to the instruction, the packet capture manager 102 moves the first network packet capture file from the primary storage 104 to a secondary storage. In response to the moving, the packet capture manager 102 changes the TTL to specify that the first network packet capture file remains in the secondary storage after the first network packet capture file is scheduled for deletion in the primary storage 104.

The system may be further configured to store a second network packet capture file in the primary storage 104 and store metadata corresponding to the first network packet capture file and the second network packet. Using a machine learning model, the system may analyze historical data of instructions received from the first network monitoring device 118. The analysis may include analyzing a relationship between the metadata the instructions. In this way, the system uses a machine learning model to learn what network packets are likely to be packets of interest.

The system may be further configured to flag the second network packet capture file as a data flow of interest based on the machine learning model analysis. In this way, the packet capture manager 102 system identifies packets of interest without explicit instructions from network monitoring devices 118.

The system may be further configured to delete the second network packet capture file from the primary storage 104 based on a change in a network traffic rate and an amount of storage provisioned for the primary storage 104. In this way, the system frees space for newer captured packets to be stored in the primary storage 104.

The primary storage 104 of the system may comprise an on-demand cloud storage service and the system may be further configured to resize the primary storage 104 based on a change in a network traffic rate. In this way, retention policy requirements may be met when traffic levels increase and the system can conserve resources when traffic levels decrease.

The system may be further configured to send an instruction to a second network monitoring device 118, or to a key broker that manages decryption keys for the purposes of network traffic analysis, to set a TTL of a decryption key stored in a secure keystore 110. The setting of the TTL of the decryption key is based on a retention policy corresponding to network packets associated with the decryption key. In this way, the packet capture manager system coordinates with other network management systems to avoid premature deletion or unnecessary storage of decryption keys corresponding to captured packets. The TTL of decryption key is matched to the TTL of the captured packets corresponding to the decryption key.

The packet capture manager 102 system may be further configured to send an instruction to another device, such as a key broker, to delete a decryption key from a secure keystore 110 in response to expiration of the TTL of the first network packet. In this way, the system managed decryption key storage by causing deletion of decryption keys corresponding to captured packets that will no longer be stored because of an expired TTL.

In addition to the system embodiments, method and computer program product embodiments are also disclosed.

FIG. 1 is a block diagram of a network infrastructure including a packet capture manager 102 according to some disclosed embodiments.

According to some embodiments, a packet capture manager 102 may be implemented in a network environment or a cloud computing environment including one or more terminal access points (TAPs) 114, a network packet broker (NPB) 116, and one or more network monitoring devices 118.

The one or more TAPs 114 may include any hardware or virtual device capable of monitoring or copying network traffic as the network traffic traverses the network. The one or more TAPs 114 may include passive or active TAPs 114. The one or more TAPs 114 may be configured to capture network traffic and send captured network traffic to the NPB 116.

A network packet broker (NPB) 116 is a device configured to receive captured packets from one or more TAPs 114 and distribute the captured packets to the one or more network monitoring devices 118. An NPB 116 may be configured to tag, filter, replicate, de-duplicate, and load balance a raw packet stream received from one or more TAPs 114. Tagging adds metadata to the captured packets, which may include identifying the network segment where the packets came from or other contextual information useful for troubleshooting. Filtering limits captured network traffic to that which is considered relevant to network management. Replication includes copying network traffic from one port to another port. Replication may be used to create identical traffic flows to multiple network monitoring devices 118. Deduplication removes duplicate packets from the raw packet stream. Load balancing may involve dividing an incoming raw packet stream among multiple network monitoring devices 118.

Network monitoring devices may include an intrusion detection system (IDS), a network performance management (NPM) 118 tool, a network packet broker (NPB) 116 or any device configured to receive captured packets and perform further analysis or processing on the captured packets. A person of ordinary skill in the art would understand the variety of functions that could be performed by a network monitoring device 118. Although one NPB 116 is shown in FIG. 1, this is purely for illustration purposes, and the environment may include multiple NPBs 116. The network environment may further include a full packet capture (FPC) device 120, a primary storage 104, a secondary storage 106, and a secure keystore 110.

The full packet capture (FPC) device 120 may include any device configured to capture header data and payload data of packets. The FPC device 120 may receive and store all packets received and forwarded from the NPB 116. The FPC device 120 may be configured to store captured packets, including header data and payload data, in the primary storage 104. According to some embodiments, the NPB 116 may be configured to send all captured network traffic to the FPC device 120 and filtered network traffic to each of the one or more network monitoring devices 118.

The secure keystore 110 may comprise offline storage for storing decryption keys corresponding to captured network traffic. The secure keystore 110 may be configured to encrypt data at rest and to encrypt data in transit. The secure keystore 110 may be configured to provide decryption keys 224 to the NPB 116 or to the one or more network monitoring devices 118 or to the packet capture manager 102.

The primary storage 104 may include local on-premise storage, cloud-based storage or any computer readable storage device or storage service. The primary storage 104 may be configured as a ring buffer, continuously overwriting the oldest data with the newest captured packets from the FPC device 120. The size of the ring buffer may depend on the amount of network traffic being captured and the amount of time to store captured packets defined in a retention policy.

The secondary storage 106 may include on-premise storage, cloud-based storage or any computer readable storage device or storage service. The secondary storage 106 may be configured to store packets that the packet capture manager 102 has identified as packets of interest.

The packet capture manager 102 may be configured to be in communication with the FPC device 120, the one or more network monitoring devices 118, the secure keystore 110, the primary storage 104, and the secondary storage 102.

As a non-limiting example of the interaction of the devices illustrated in FIG. 1, the one or more TAPs 114 may capture packets from network traffic and send the captured packets to the NPB 116. The NPB 116 may forward captured packets to the FPC device 120, which stores the captured packets in the primary storage 104. The NPB 116 may also forward one or more of the captured packets to one or more network monitoring devices 118. Each captured packet may be stored in a packet capture (PCAP) file that stores all the packets in a data flow between a source and destination network address and transport protocol port (e.g., between a source Internet protocol (IP) address/source transmission control protocol (TCP) port and a destination IP address/destination TCP port). The data flow may include packets both from the source to the destination and vice versa (e.g., when a reply is made). The packet capture file may have a time-to-live (TTL) according to a retention policy. The retention policy may include a TTL defining a minimum amount of time that each captured packet should be stored (in any one of the primary or secondary storage 104 or 106) before deletion.

According to some embodiments, the packet capture manager 102 may receive an instruction from the network monitoring devices 118, and the instruction may identify one or more captured data flows from NPB 116 as data flows of interest. To identify a data flow, a community ID may be used. The community ID may be a way to generate a unique identifier for a data flow. For example, a community ID may be generated by taking a seeded hash of a five-tuple, including the source IP address, destination IP address, source port, destination port and the transport protocol. In some embodiments, the seeded hash may be compressed and a version number for the identifier may be added. The community ID should also be referenced to identify and correlate packet capture files with ephemeral keys. As a non-limiting example a network monitoring device 118 may be an intrusion detection system. The intrusion detection system (IDS) may detect a suspicious network traffic pattern or suspicious data in a packet header or packet payload. The IDS may send an instruction to the packet capture manager 102 including metadata that identifies the one or more captured packet capture files detected by the IDS. The packet capture manager 102 may identify one or more captured packet files as data flows of interest based on the instructions received from the IDS. The packet capture manager 102 may flag the identified packets of interest.

Other network monitoring devices 118 may be used as well. Examples of network monitoring devices 118 include a user activity monitoring device (such as the Insider Threat application available from ForcePoint of Austin, Tex.), a data loss prevention device, or a proxy server. The various network monitoring devices 118 may communicate with each other or with other components, such as packet capture manager 102, using a stream-processing software platform. Stream processing is a computer programming paradigm that allows some applications to more easily exploit a limited form of parallel processing. Given a sequence of data (a stream), a series of operations is applied to each element in the stream. An example of such a stream-processing software platform is an APACHE KAFKA platform available from the Apache Software Foundation of Wakefield, Mass.

According to some embodiments, the packet capture manager 102 may analyze historical data related to captured packets and identify a captured data flow as a data flow of interest. The packet capture manager 102 may flag the identified data flow of interest. As a non-limiting example, historical data may include a past detection of malware communication or infection. The detected malware may be associated with packets sent to or received from a suspicious domain. Analysis of the historical data may detect an association between the suspicious domain and the detection of malware. Based on this analysis, the packet capture manager 102 may detect the suspicious domain in a captured packet and identify the data flow including the captured packet as a data flow of interest.

In another non-limiting example, the packet capture manager 102 may analyze historical data containing suspicious traffic patterns associated with a detected security breach. In different examples, suspicious traffic may be identified by evaluating the number of bytes transferred or the ratio of bytes in versus out. In another example, suspicious traffic may be identified according to the destination IP address or domain of the data flow in the packet capture file. Based on this analysis, the packet capture manager 102 may detect the suspicious traffic pattern in the captured packets stored in the primary storage 104 and identify the captured data flows including the packets associated with the suspicious traffic pattern as data flows of interest.

The packet capture manager 102 may copy or move the identified packet capture files that store the data flows of interest from the primary storage 104 to the secondary storage 106. According to some embodiments, packet capture files copied or moved to the secondary storage 106 may be deleted from the primary storage 104. This immediately frees space in the primary storage 104, which reduces the overall space required for storing captured packet capture files in a manner conforming to the retention policy. According to some embodiments, packet capture files copied to the secondary storage 106 may be marked or otherwise identified as safe for overwriting. When allocated storage space is full, the FPC device 120 may overwrite marked packet capture files in the primary storage 104 to meet the requirements of the retention policy. In response to moving a packet capture file to the secondary storage 106, the packet capture manager 102 may change the TTL of the moved captured packet file to specify that the moved captured packet file remains in the secondary storage 106 after the captured packet file is scheduled for deletion in the primary storage 104.

In this way, the packet capture manager 102 may preserve data flows of interest and implement a more complex retention policy using a multi-tiered storage system. The more complex retention policy may include a first duration for storing packets in the primary storage 104 and a second duration for storing packets belonging to data flows of interest in the secondary storage 106. The data flows of interest are more likely to be useful in future investigations or forensic analysis after discovery of a security breach or performance issue. The quantity of network traffic identified as data flows of interest is also likely to be much lower than the total amount of network traffic that is initially stored. This enables data flows of interest to be stored for a much longer period of time while still allowing for feasible storage requirements.

Figure 2:
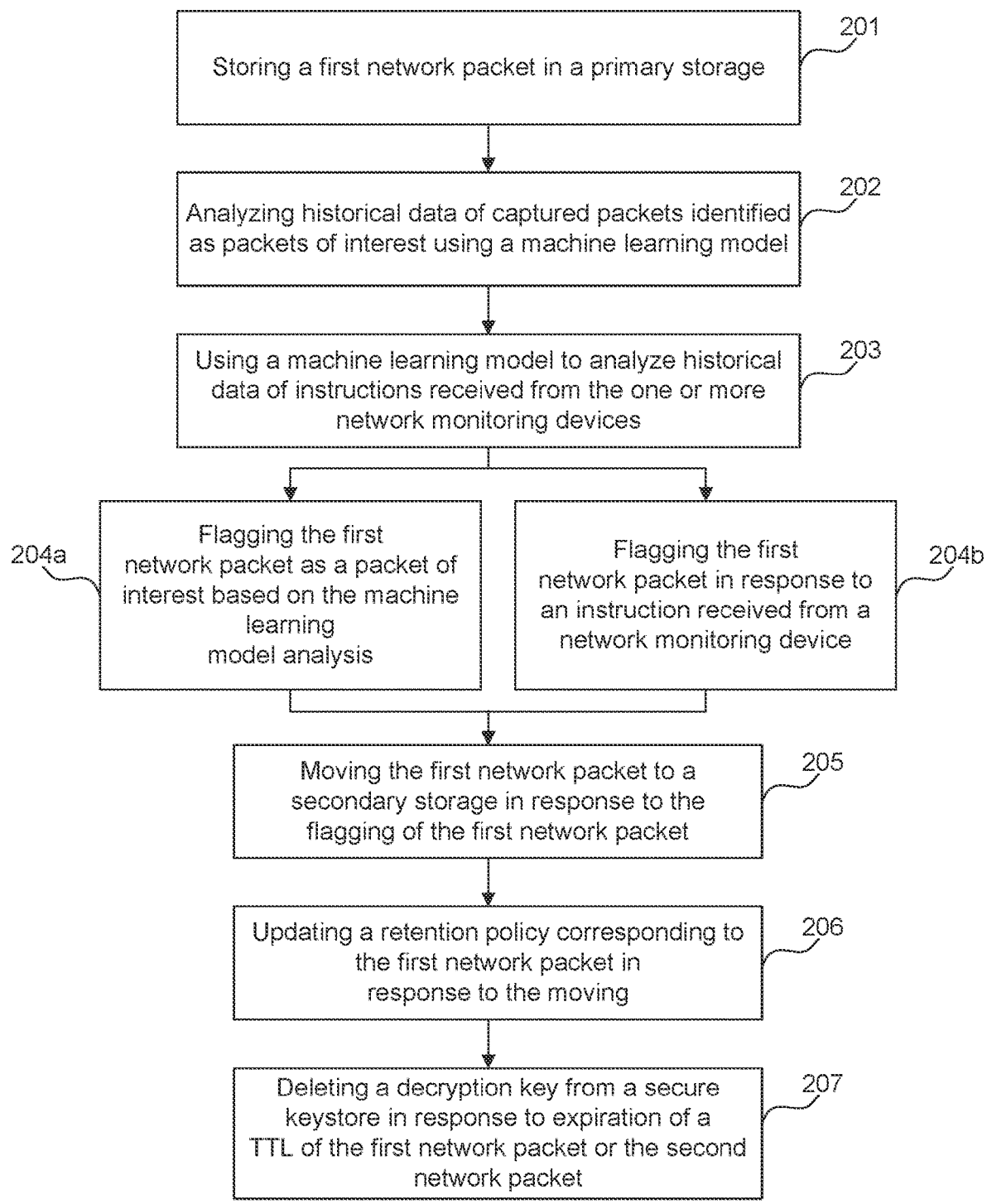
FIG. 2 is a flowchart illustrating a process of managing packet capture storage, according to some embodiments.

FIG. 2 is a flowchart illustrating a process of managing packet capture storage according to some disclosed embodiments. Network traffic may be captured by the TAPs 114, and sent to one or more NPBs 116. FIG. 1 illustrates one NPB 116 for illustration purposes only, but there is no reason why a network monitoring infrastructure cannot have multiple NPBs 116. The NPB 116 may forward captured network traffic to the FPC device 120. Captured network traffic may include multiple captured network packets.

At step 201, the FPC device 120 may store a first network packet capture file in the primary storage 104. The first network packet capture file may be associated with a TTL, which indicates how long the packet capture file should be stored based on the retention policy.

According to some embodiments, the TTL of packet capture files may have a relationship to the TTL of decryption keys, including ephemeral keys, corresponding to the data flows of the packet capture files. The TTL of ephemeral keys under the transport layer security (TLS) 1.3 standard is different than the TTL of RSA private keys for TLS 1.2 and below. RSA Keys typically have a 1-2 year expiration while ephemeral keys are created and discarded in conjunction with a single communications session. According to some embodiments, the TTL of ephemeral keys may be based on the retention policy. This is because a given ephemeral key can only decrypt packets from a single TLS session, and if the retention policy dictates that a PCAP is only stored for 7 days, for example, then the TTL of the ephemeral key for that PCAP should also be 7 days.

At step 202, the FPC device 120 may store metadata corresponding to the first network packet capture file and the second network packet capture file. Metadata may be stored in the primary storage 104 with the first network packet capture file and the second network packet capture file or metadata may be stored in a separate storage and linked to the corresponding packet capture files in the primary storage 104.

At step 203, the packet capture manager 102 may analyze historical data using a machine learning model. According to some embodiments, the historical data may be data related to previously captured packets that were identified as suspicious or associated with security breaches or network performance issues. According to some embodiments, the historical data may be data related to instructions received from one or more network monitoring devices 118. To correlate the data flows between the various network monitoring devices 118, a community ID may be used, as described above. The instructions received from the one or more network monitoring devices 118 may identify captured packets or data flows related to suspicious activity, network performance issues, security breaches, or otherwise of interest based on the security policies implemented by the network monitoring devices 118. The instructions may include criteria for identifying data flows of interest, such as a time frame, a source address, a destination address, for example.

The packet capture manager 102 may identify packet capture files as storing data flows of interest to be copied from primary storage 104 to secondary storage 106. Identification of packet capture files may include flagging packet capture files as data flows of interest. Data flows of interest may include packets sent to or from a suspicious domain, packets involved in suspicious traffic patterns, traffic containing suspicious data in the packet header, packets containing suspicious data in the packet payload, or any packets that may violate network security policies. Network security policies may differ from one network environment to another a person skilled in the art would understand that identifying data flows of interest depends, at least in part, on the particular goals of network administrators. The packet capture manager 102 may flag data flows based on the machine learning model analysis or based on instructions received from the network monitoring devices 118.

At step 204a, the packet capture manager 102 may flag the first network data flow as a data flow of interest based on the machine learning model analysis. The machine learning model may identify data flows of interest independently of and in addition to packets identified base on instructions received from the network monitoring devices 118. Over time, the machine learning model may improve its ability to identify data flows of interest. For example, when captured packets are decrypted and analyzed using network security tools and found to contain malware, found to be associated with a security breach, or otherwise violate security policies, this information may be provided to the machine learning model to further refine the machine learning model's identification of packets of interest.

Machine learning involves training algorithm based on a training set of network packet data that has already been identified as being as suspicious or not. Example algorithms include classification and regression algorithms, such as logistic regression or support vector machines. Clustering analysis may also be used, including supervised and unsupervised techniques like K-nearest neighbor and K-means clustering.

At step 204b, the packet capture manager 102 may flag the first data flow as a data flow of interest based on an instruction received from a network monitoring device. As non-limiting example, one of the network monitoring devices 118 may be an intrusion detection system. The IDS may have a ruleset used for identifying packets that contain malware or are otherwise associated with a security breach or network intrusion. An IDS ruleset match would trigger the IDS to make an API call instructing the packet capture manager 102 to move the first packet capture file from the primary storage 104 to secondary storage 106. The secondary storage may be long-term storage provided by a cloud-based storage service. The API call may include relevant metadata necessary to match the captured traffic from the IDS to the first network packet stored on in the primary storage 104. As described above, the API call may use a community ID.

In another non-limiting example, a Data Loss Prevention (DLP) device detects a traffic flow that violates DLP policy. The detected traffic flow triggers an API call instructing the packet capture manager 102 to move the first packet capture file from the primary storage 104 to secondary storage 106. The API call may include relevant metadata necessary to match the captured traffic from the DLP to the first packet capture file stored in the primary storage 104.

In yet another non-limiting example, a custom insider threat service is configured to track suspicious behavior of network users. The insider threat service detects that a network user's risk score is above a predefined threshold. The insider threat service makes an API call instructing the packet capture manager 102 to move network traffic corresponding to the high-risk user, including the first network packet capture file, from the primary storage 104 to secondary storage 106. The API call may include relevant metadata necessary to identify the network packets corresponding to the high-risk network user stored on in the primary storage 104.

At step 205, the packet capture manager 102 may move the first packet capture file from the primary storage 104 to secondary storage 106 based on the flagging of the first network data flow. According to some embodiments, the packet capture manager 102 may move packet capture files of interest to the secondary storage 106 in response to identification or flagging of the data flows as data flows of interest. According to some embodiments, the packet capture manager 102 may periodically move flagged packets to the secondary storage.

At step 206, the packet capture manager 102 may update the retention policy corresponding to the first packet capture file in response to the moving. Updating the retention policy may include changing the TTL of the packet capture file. Changing the TTL may include changing the TTL to an increased or indefinite amount of time. Updating the retention policy may further include changing a TTL of a decryption key associated with the first packet capture file to match the TTL of the first packet capture file. In this way, the decryption key required for decrypting the first data flow is retained together with the first packet capture file.

By moving the first packet capture file to the secondary storage 106 and updating the retention policy of the first network packet, the packet capture manager 102 identifies, isolates, and preserves network packets which are of interest to network performance management or network security management. These activities of the packet capture manager 102 allow the retention policy to focus on data flows of interest, rather than all captured packets.

At step 207, the packet capture manager 102 may instruct the device or module, such as a key broker, to delete a decryption key from the secure keystore 110 in response to expiration of a TTL of the first packet capture file or the second packet capture file. The deleted decryption key may be a decryption key associated with the data flows in the first packet capture file or the second packet capture file. Deleting unused decryption keys reduces storage costs associated with storing decryption keys. Because ephemeral keys are created for each TLS session, the number of ephemeral keys stored for a large network may be in the trillions. Deleting unused decryption keys from the key store frees space for the storage of decryption keys that may be used for analysis of other captured network traffic still being stored. Deleting unused decryption keys also reduces exposure of decryption keys to security threats and is part of the packet capture management that ensures storage space requirements do not become infeasible. Deleting unused decryption key aligns key management with PCAP retention ensuring that the decryption key storage time matches the storage time of corresponding PCAPs.

Figure 3:
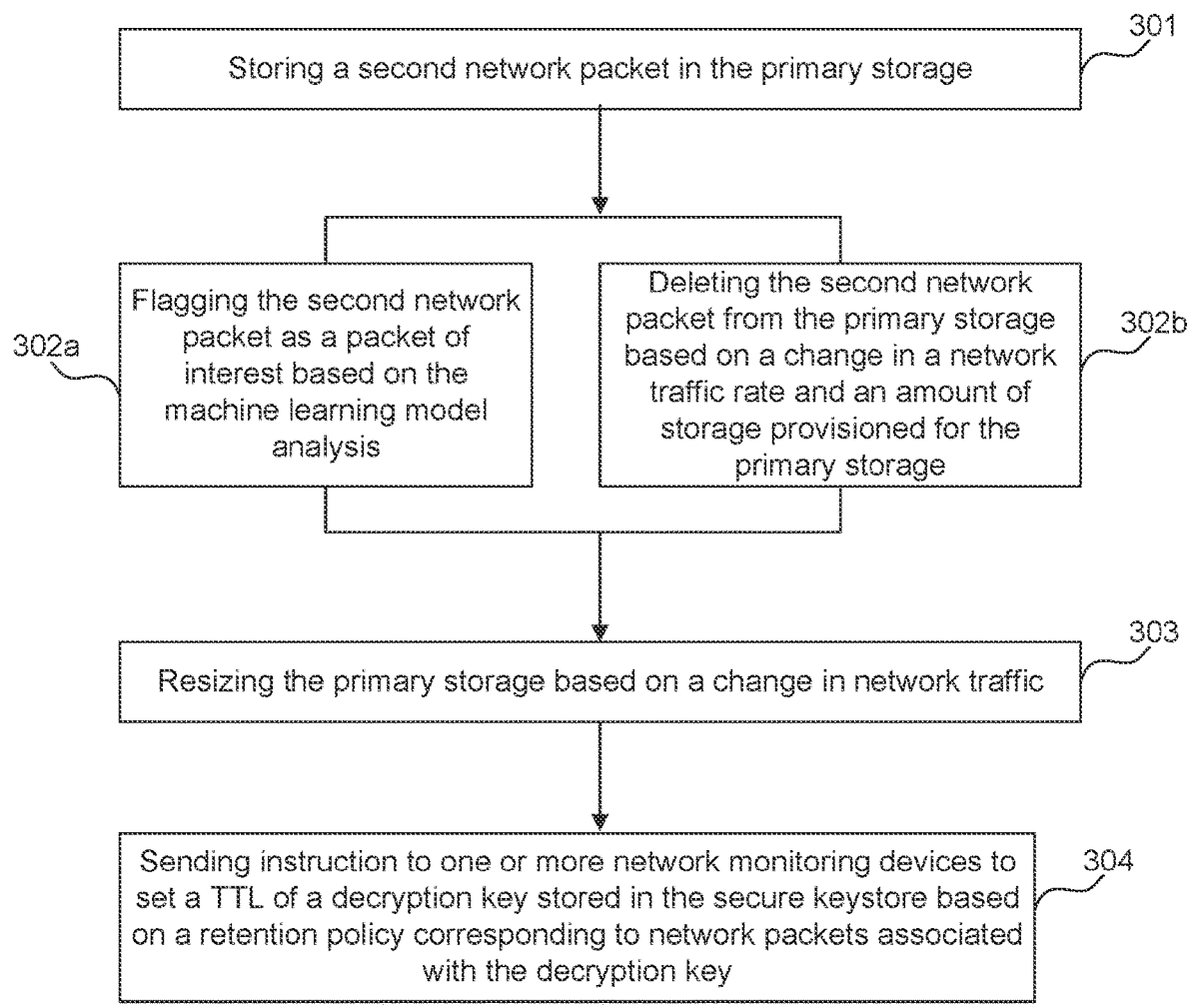
FIG. 3 is a flowchart illustrating a process of managing packet capture storage, according to some embodiments.

FIG. 3 is a flowchart illustrating a process of managing packet capture storage according to some disclosed embodiments.

At step 301, the FPC 120 stores a second packet capture file in the primary storage 104. The second packet capture file may be associated with a TTL, which indicates how long the captured data flow should be stored based on the retention policy.

At step 302a, the packet capture manager 102 may flag the second packet capture file as storing a data flow of interest based on the machine learning analysis. Alternatively, at step 302b, the packet capture manager 102 may delete the second packet capture file from the primary storage 104 based on a change in a network traffic rate and an amount of storage provisioned for the primary storage 104. The packet capture manager 102 enables a more flexible retention policy to be applied to captured packets remaining in the primary storage. As a non-limiting example, according to some embodiments, captured packets in the primary storage 104 may be overwritten, as new network traffic is captured, without applying any particular TTL to the captured packets in the primary storage 104. This effectively creates a variable TTL that adjusts based on changes in traffic flow. Captured packets stored in the primary storage 104 may be overwritten or deleted in response to natural changes in traffic flows and the amount of storage provisioned for the primary storage 104.

At step 303, the packet capture manager 102 may resize the primary storage 104 based on a change in the network traffic. According to some embodiments, a local primary storage 104 solution may be implemented in a cloud computing environment and configured to dynamically resize primary storage 104. Resizing primary storage 104 may be performed in response to observing network traffic and calculating how much network traffic needs to be ingested from existing and newly instantiated virtual machines in the cloud computing environment.

The packet capture manager 102 may respond to changes in the network traffic rate by resizing the primary storage 104. This allows a static retention policy with a static TTL to be applied to the captured packets stored in the primary storage 104. As the network traffic rate increases, in order to meet the requirements of a static retention policy, the packet capture manager 102 may increase the amount of storage allocated or provisioned from the primary storage 104. The packet capture manager 102 may monitor the network traffic rate through data or metadata received from one or more network packet brokers 116 deployed in the network infrastructure. The packet capture manager 102 may be configured to track network traffic levels from endpoints, servers, virtual machines or NPBs 116, in the context of the desired retention policy, and the amount of provisioned storage. As a non-limiting example, a packet capture manager 102 operating in a cloud computing environment may monitor network traffic levels in the cloud computing environment. When traffic levels rise or fall over a sufficient time window, the packet capture manager 102 may make API calls to the increase or decrease an elastic storage volume providing the primary storage 104.

As another non-limiting example, if TAPs 114 are capturing traffic from ten machines that are generating 500 Megabits (Mb) per second to a NPB 116, and the desired retention policy is one day, then 54 Terabytes (TB) of storage is required to ingest 5 Gigabits (Gb) per second for one day. If traffic on those 10 machines increases to 1 Gb per second instead of 500 Mb per second, the NPB 116 will receive a total of 10 Gb per second and send 10 Gb per second of traffic to the FPC device 120. In order to maintain a one day retention of captured traffic (PCAP) or to be in compliance with the Retention policy, the amount of storage provisioned for PCAP storage must be resized from 54 TB to 108 TB. The packet capture manager 102 is in a unique position to track changes in network traffic levels and respond to changes by increasing local storage to stay in compliance with the retention policy, decreasing the TTL in order to maintain a constant storage space, or decrease local storage to reduce operational costs. The retention policy may dictate which actions to perform under a variety of circumstances.

At step 304, the packet capture manager 102 may send an instruction to one or more network monitoring devices 118, or another device such as a key broker, to set a TTL of a decryption key stored in the secure keystore 110 based on a retention policy corresponding to the network packet associated with the decryption key. According to some embodiments, an FPC device 120 solution may connect the retention policy with ephemeral key management. An FPC solution may store ephemeral keys corresponding to packets that are stored in primary storage 104 or secondary storage 106 and reduce unnecessary storage of ephemeral keys corresponding to packets that have been deleted based on the retention policy.

According to some embodiments, the packet capture manager 102 may intelligently instruct a manager of the secure keystore 110, such as a key broker, to set the TTL of an ephemeral key to match the current retention policy. The packet capture manager 102 may set the TTL of a decryption key in association with moving corresponding PCAPs from the primary storage 104 secondary storage 106. Setting the TTL may include changing an initial TTL to an increased or indefinite amount of time. The packet capture manager 102 may send the instruction to set the TTL of ephemeral keys via an API call. By setting the TTL of decryption keys, the packet capture manager 102 synchronizes the TTL of the decryption keys with the retention policy for captured packets associated with the decryption keys. In this way, the decryption keys required for decrypting the captured network packets are retained together with their associated captured network packets.

Figure 4:
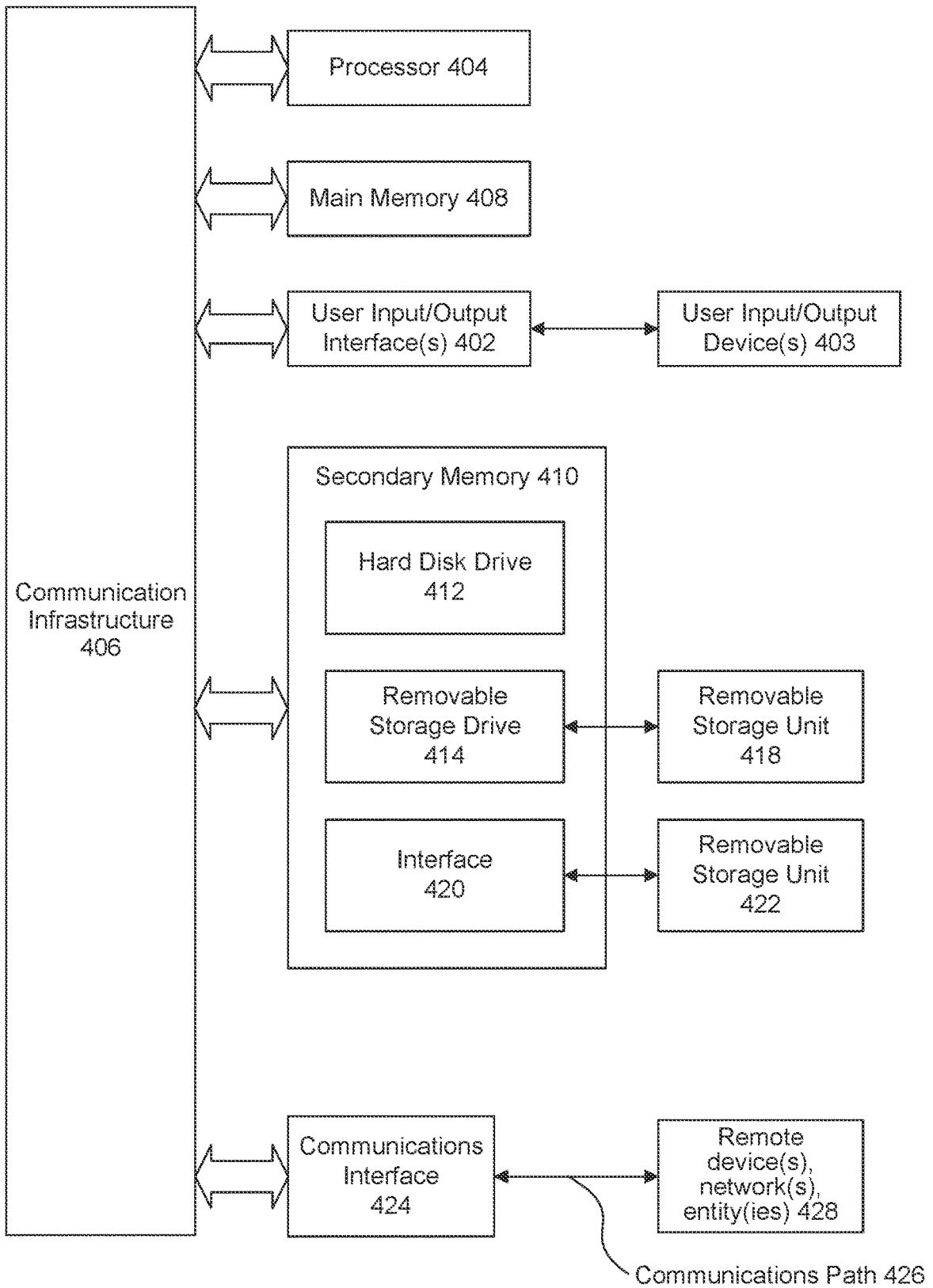
FIG. 4 is a block diagram of an example computer system useful for implementing various embodiments herein.

FIG. 4 is a block diagram of an example computer system useful for implementing various embodiments disclosed herein.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache and/or registers. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

Figure 5:
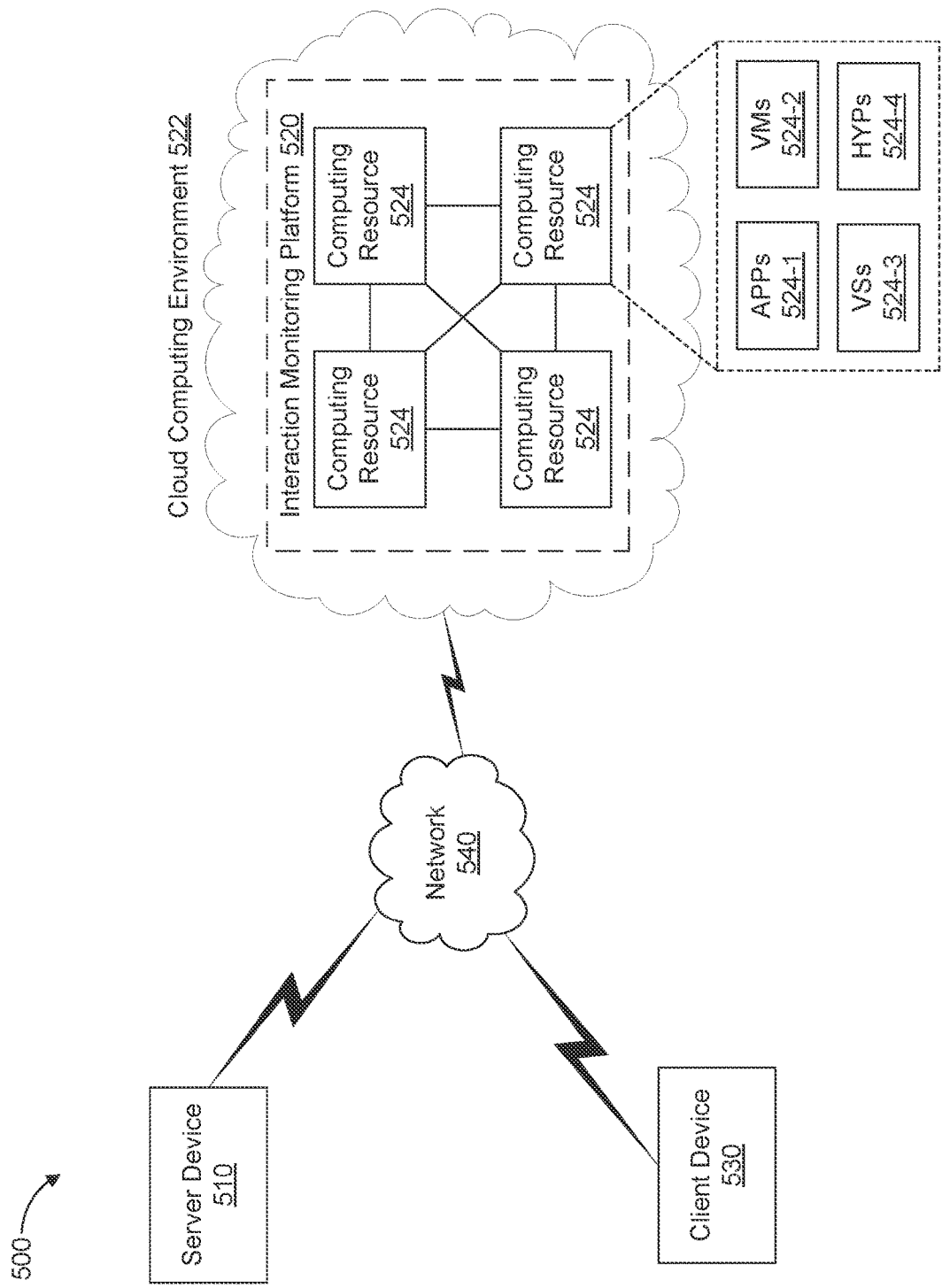
FIG. 5 is a block diagram of a non-limiting example environment in which systems or methods described herein may be implemented.

FIG. 5 is a diagram of a non-limiting example environment in which systems or methods described herein may be implemented.

As shown in FIG. 5, an environment 500 may include a server device 510, an interaction monitoring platform 520, a client device 530, and/or the like. Devices of environment 500 may interconnect via wired connections, wireless connections, or a combination of wired and wireless connections.

Server device 510 includes one or more devices capable of receiving, generating, storing, processing, and/or providing information associated with user interactions. For example, server device 510 may include a server device (e.g., a host server, a web server, an application server, etc.), a data center device, or a similar device. In some implementations, server device 510 may be capable of communicating with client device 530 and/or interaction monitoring platform 520, in a manner designed to facilitate collection of interaction data 104 and/or response data 106. For example, server device 510 may receive, obtain and/or capture interaction data 104 and/or response data 106, may collect interaction data 104 and/or response data 106 for a historical period of time or in real time, and/or may send the interaction data 104 and/or response data 106 to interaction monitoring platform 520. Server device 510 may obtain current user interaction information in real-time and/or send the current user interaction information to interaction monitoring platform 520 in real-time.

Interaction monitoring platform 520 includes one or more devices that receive and/or process information (e.g., historical interaction data 104 and/or historical response data 106, current user interaction data 104, one or more touchpoints, and/or the like), generate information (e.g., a user sentiment, user interaction score of a user interaction, an association between the user interaction score and a touchpoint set, a ranking of one or more touchpoint sets of the user interaction, and/or the like), determine information (e.g. a user interaction score of a user interaction, an association between the user interaction score and a touchpoint set, a ranking of one or more touchpoint sets of the user interaction, user sentiment, and/or the like) and/or generate an alert indicating that action needs to be taken. Interaction monitoring platform 520 may perform, or cause to be performed, at least one action.

In some implementations, interaction monitoring platform 520 can be designed to be modular such that certain software components can be swapped in or out depending on a particular need. As such, interaction monitoring platform 520 can be easily and/or quickly reconfigured for different uses. In some implementations, interaction monitoring platform 520 can receive information from and/or transmit information to server device 510, client device 530, and/or the like.

In some implementations, as shown, interaction monitoring platform 520 can be hosted in a cloud computing environment 522. Notably, while implementations described herein describe interaction monitoring platform 520 as being hosted in cloud computing environment 522, in some implementations, interaction monitoring platform 520 may be implemented outside of a cloud computing environment or may be partially cloud-based.

Cloud computing environment 522 includes an environment that hosts interaction monitoring platform 520. Cloud computing environment 522 can provide computation, software, data access, storage, etc. services that do not require end-user knowledge of a physical location and configuration of system(s) and/or device(s) that host interaction monitoring platform 520. As shown, cloud computing environment 522 can include a group of computing resources 524 (referred to collectively as "computing resources 524" and individually as "computing resource 524").

Computing resource 524 may include one or more personal computers, workstation computers, server devices, or other types of computation and/or communication devices. In some implementations, computing resource 524 can host interaction monitoring platform 520. The cloud resources can include compute instances executing in computing resource 524, storage devices provided in computing resource 524, data transfer devices provided by computing resource 524, etc. In some implementations, computing resource 524 can communicate with other computing resources 524 via wired connections, wireless connections, or a combination of wired and wireless connections.

As further shown in FIG. 5, computing resource 524 may include a group of cloud resources, such as one or more applications ("APPs") 524-1, one or more virtual machines ("VMs") 524-2, virtualized storage ("VSs") 524-3, one or more hypervisors ("HYPs") 524-4, and/or the like.

Application 524-1 may include one or more software applications that can be provided to or accessed by client device 530. Application 524-1 can eliminate a need to install and execute the software applications on client device 530. For example, application 524-1 can include software associated with interaction monitoring platform 520 and/or any other software capable of being provided via cloud computing environment 522. In some implementations, one application 524-1 can send/receive information to/from one or more other applications 524-1, via virtual machine 524-2.

Virtual machine 524-2 includes a software implementation of a machine (e.g., a computer) that executes programs like a physical machine. Virtual machine 524-2 can be either a system virtual machine or a process virtual machine, depending upon use and degree of correspondence to any real machine by virtual machine 524-2. A system virtual machine can provide a complete system platform that supports execution of a complete operating system ("OS"). A process virtual machine can execute a single program, and can support a single process. In some implementations, virtual machine 524-2 can execute on behalf of a user (e.g., client device 530 or an operator of interaction monitoring platform 520), and can manage infrastructure of cloud computing environment 522, such as data management, synchronization, or long-duration data transfers.

Virtualized storage 524-3 includes one or more storage systems and/or one or more devices that use virtualization techniques within the storage systems or devices of computing resource 524. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 524-4 can provide hardware virtualization techniques that allow multiple operating systems (e.g., "guest operating systems") to execute concurrently on a host computer, such as computing resource 524. Hypervisor 524-4 can present a virtual operating platform to the guest operating systems, and can manage the execution of the guest operating systems. Multiple instances of a variety of operating systems can share virtualized hardware resources.

Client device 530 includes one or more devices capable of receiving, generating, storing, processing, and/or providing information associated with user interaction. For example, client device 530 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Client device 530 may receive and/or obtain an alert from inter-action monitoring platform 520. Client device may display the alert and/or perform, or cause to be performed, at least one action based on the alert.

Network 540 includes one or more wired and/or wireless networks. For example, network 540 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 5 is provided as a non-limiting example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of packet capture management, the method comprising:
   storing a first network packet capture file in a primary storage, wherein a retention policy specifies an amount of time that traffic captured by a packet capture management system should be stored and includes a time-to-live (TTL) of the first network packet capture file, wherein the first network packet capture file stores a captured data flow between a source and a destination exchanging network packets;
   receiving an instruction, from a first network monitoring device that monitors or analyzes the traffic, identifying the first network packet capture file as being of interest to a network administrator;
   in response to the instruction, moving the first network packet capture file from the primary storage to a secondary storage;
   in response to the moving, changing the TTL to specify that the first network packet capture file remains in the secondary storage after the first network packet capture file is scheduled for deletion in the primary storage; and
   resizing the primary storage based on a change in a network traffic rate, wherein the primary storage comprises an on-demand cloud storage service.

2. The method of claim 1, further comprising:
   storing metadata corresponding to the first network packet capture file; and
   analyzing, using a machine learning model, historical data of instructions received from the first network monitoring device, wherein the analysis includes analyzing a relationship between the metadata and the instructions.

3. The method of claim 2, further comprising:
   storing a second network packet capture file in the primary storage; and
   flagging the second network packet capture file as a packet file of interest based on the machine learning model analysis.

4. The method of claim 2, further comprising:
   storing a second network packet capture file in the primary storage; and
   deleting the second network packet capture file from the primary storage based on the change in the network traffic rate and an amount of storage provisioned for the primary storage.

5. The method of claim 1, further comprising:
   sending an instruction to a second network monitoring device to set a TTL of a decryption key stored in a secure keystore, wherein the setting of the TTL of the decryption key is based on the retention policy corresponding to network packets associated with the decryption key.

6. The method of claim 1, further comprising:
   deleting a decryption key from a secure keystore in response to expiration of the TTL of the first network packet capture file.

7. The method of claim 1, further comprising:
   identifying the first network packet capture file as being of interest to a network administrator using a machine learning model.

8. A system comprising one or more processors and a memory configured to perform steps comprising:
   storing a first network packet capture file in a primary storage, wherein a retention policy specifies an amount of time that traffic captured by a packet capture management system should be stored and includes a time-to-live (TTL) of the first network packet capture file;
   receiving an instruction, from a first network monitoring device that monitors or analyzes the traffic, identifying the first network packet capture file as being of interest to a network administrator;
   in response to the instruction, moving the first network packet capture file from the primary storage to a secondary storage;
   in response to the moving, changing the TTL to specify that the first network packet capture file remains in the secondary storage after the first network packet capture file is scheduled for deletion in the primary storage; and
   resizing the primary storage based on a change in a network traffic rate, wherein the primary storage comprises an on-demand cloud storage service.

9. The system of claim 8, wherein the one or more processors are further configured to perform the steps of:
   storing metadata corresponding to the first network packet capture file; and
   analyzing, using a machine learning model, historical data of instructions received from the first network monitoring device, wherein the analysis includes analyzing a relationship between the metadata and the instructions.

10. The system of claim 9, wherein the one or more processors are further configured to perform the steps of:
    storing a second network packet capture file in the primary storage; and
    flagging the second network packet capture file as a packet file of interest based on the machine learning model analysis.

11. The system of claim 9, wherein the one or more processors are further configured to perform the steps of:
    storing a second network packet capture file in the primary storage; and
    deleting the second network packet capture file from the primary storage based on the change in the network traffic rate and an amount of storage provisioned for the primary storage.

12. The system of claim 8, wherein the one or more processors are further configured to perform the steps of:

sending an instruction to a second network monitoring device to set a TTL of a decryption key stored in a secure keystore,
wherein the setting of the TTL of the decryption key is based on the retention policy corresponding to network packets associated with the decryption key.

13. The system of claim 8, wherein the one or more processors are further configured to perform the steps of:
deleting a decryption key from a secure keystore in response to expiration of the TTL of the first network packet capture file.

14. A non-transitory computer readable medium storing instructions that, when executed by a processor, cause the processor to perform operations comprising:
storing a first network packet capture file in a primary storage, wherein a retention policy specifies an amount of time that traffic captured by a packet capture management system should be stored and includes a time-to-live (TTL) of the first network packet capture file, wherein the first network packet capture file stores a captured data flow between a source and a destination exchanging network packets;
receiving an instruction, from a first network monitoring device that monitors or analyzes the traffic, identifying the first network packet capture file as being of interest to a network administrator;
in response to the instruction, moving the first network packet capture file from the primary storage to a secondary storage;
in response to the moving, changing the TTL to specify that the first network packet capture file remains in the secondary storage after the first network packet is scheduled for deletion in the primary storage; and
resizing the primary storage based on a change in a network traffic rate, wherein the primary storage of the system comprises an on-demand cloud storage service.

15. The non-transitory computer readable medium of claim 14, wherein the operations further comprise:
storing metadata corresponding to the first network packet capture file and a second network packet capture file; and
analyzing, using a machine learning model, historical data of instructions received from the first network monitoring device, wherein the analysis includes analyzing a relationship between the metadata and the instructions.

16. The non-transitory computer readable medium of claim 15, wherein the operations further comprise:
storing a second network packet capture file in the primary storage; and
flagging the second network packet capture file as a packet file of interest based on the machine learning model analysis.

17. The non-transitory computer readable medium of claim 15, wherein the operations further comprise:
storing a second network packet capture file in the primary storage; and
deleting the second network packet capture file from the primary storage based on the change in the network traffic rate and an amount of storage provisioned for the primary storage.

18. The non-transitory computer readable medium of claim 14, wherein the operations further comprise:
sending an instruction to a second network monitoring device to set a TTL of a decryption key stored in a secure keystore, wherein the setting of the TTL of the decryption key is based on the retention policy corresponding to network packets associated with the decryption key.

19. The non-transitory computer readable medium of claim 14, wherein the operations further comprise:
deleting a decryption key from a secure keystore in response to expiration of the TTL of the first network packet capture file.

20. The non-transitory computer readable medium of claim 14, wherein the operations further comprise:
identifying the first network packet capture file as being of interest to a network administrator using a machine learning model.

* * * * *